US011245660B1

(12) United States Patent
Anandakrishnan et al.

(10) Patent No.: US 11,245,660 B1
(45) Date of Patent: Feb. 8, 2022

(54) COMMUNICATION OF ENDPOINT INFORMATION AMONG VIRTUAL SWITCHES

(71) Applicant: Cisco Technology, Inc., San Jose, CA (US)

(72) Inventors: Geetha Anandakrishnan, Sunnyvale, CA (US); Paramjeet Rajpaul, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/659,217

(22) Filed: Oct. 21, 2019

Related U.S. Application Data (60) Provisional application No. 62/906,451, filed on Sep. 26, 2019.

(51) Int. Cl.
*H04L 29/12* (2006.01)
*H04L 12/931* (2013.01)
*H04L 29/08* (2006.01)
*G06F 9/455* (2018.01)

(52) U.S. Cl.
CPC .......... *H04L 61/15* (2013.01); *G06F 9/45558* (2013.01); *H04L 49/70* (2013.01); *H04L 67/10* (2013.01); *G06F 2009/4557* (2013.01)

(58) Field of Classification Search
CPC ......... H04L 49/70; H04L 61/15; H04L 67/10; G06F 2009/4557; G06F 9/45558
See application file for complete search history.

(56) References Cited

U.S. PATENT DOCUMENTS

| | | | |
|---|---|---|---|
| 9,461,943 B2 * | 10/2016 | Narasimhan | H04L 61/2076 |
| 9,485,147 B2 | 11/2016 | Gu | |
| 9,513,970 B2 * | 12/2016 | Kapadia | H04L 12/4625 |
| 9,641,389 B2 | 5/2017 | Kothari et al. | |
| 9,798,572 B2 | 10/2017 | Li et al. | |
| 9,876,715 B2 | 1/2018 | Edsall et al. | |
| 10,326,838 B2 | 6/2019 | Puri et al. | |
| 2003/0130833 A1 * | 7/2003 | Brownell | H04L 49/351 703/23 |
| 2014/0075047 A1 * | 3/2014 | Narasimhan | G06F 11/203 709/238 |

(Continued)

*Primary Examiner* — Jeong S Park
(74) *Attorney, Agent, or Firm* — Lee & Hayes, P.C.

(57) ABSTRACT

Techniques for utilizing virtual edge switches of cloud computing networks to send, receive, and store in respective virtual memory, associations between virtual resource and virtual edge switches for better convergence in virtual application centric infrastructure networks. Each virtual memory acts as a virtual endpoint database and contains a number of records indicating associations between each virtual endpoint and the virtual edge switch attached to the virtual endpoint. Each virtual edge switch is hosted by a physical server and is configured to forward communications received from separate physical servers in the cloud computing network to the virtual endpoints attached to the virtual edge switch. The advertisement messages are configured to be sent upon a new virtual resource or a migrated virtual resource spinning-up on a physical server. The advertisement message may be configured to store additional network routing information associated with the virtual machine hosting the virtual endpoint.

20 Claims, 6 Drawing Sheets

(56) References Cited

U.S. PATENT DOCUMENTS

| | | | |
|---|---|---|---|
| 2014/0250220 A1* | 9/2014 | Kapadia | G06F 9/5077 709/224 |
| 2014/0344424 A1* | 11/2014 | Sato | G06F 9/45558 709/221 |
| 2017/0295130 A1* | 10/2017 | Mahajan | H04L 12/4641 |
| 2018/0006969 A1* | 1/2018 | Venkateshaiah | H04L 61/103 |
| 2020/0034167 A1* | 1/2020 | Parthasarathy | G06F 9/45558 |
| 2020/0382405 A1* | 12/2020 | Banerjee | H04L 45/121 |

* cited by examiner

COMMUNICATION OF ENDPOINT INFORMATION AMONG VIRTUAL SWITCHES

RELATED APPLICATIONS

This application claims priority to U.S. Provisional Patent Application No. 62/906,451, filed on Sep. 26, 2019, the entire contents of which are incorporated herein by reference.

TECHNICAL FIELD

The present disclosure relates generally to communicating endpoint information among virtual switches associated with instances of services across physical servers to improve communications between the services.

BACKGROUND

Cloud computing provides users with access to computing resources to fulfill users' computing resource needs. In some examples, service providers can manage and provide cloud computing resources to users to fulfill their needs without the users having to invest in and maintain their own computing infrastructure. Cloud computing often involves the use of networks of data centers which house servers, routers, and other devices that provide computing resources to users such as compute resources, networking resources, storage resources, database resources, application resources, and so forth. Users may be allocated portions of the computing resources using virtualization technology that remain available for peak demands of the users. The virtualized portions, or virtualized networks, of computing resources may be scaled up (or down) according to the computing needs of a given user without the need to maintain excess computing capacity. For example, an online retailer can scale a virtualized network of computing resources to meet increased demand during the holiday shopping season without having to maintain the underlying physical computing infrastructure used to provide the retailer's online presence.

To support a service (or application) using cloud computing, various types of schedulers are utilized to automate deployment, scaling, and operations of the virtual computing resources (or "virtual resources") across physical servers in a cloud computing network. To effectively orchestrate the virtual resources, the schedulers may track what virtual resources have been placed on what physical servers in order to determine where to spin up or migrate virtual resources. For example, a scheduler may determine that the resource utilization of a physical server has increased, and the physical server may be unable to support one or more virtual resources deployed to the physical server. The scheduler may then identify an additional physical server that has availability of server resources to adequately support the virtual resource. The virtual resource may then be migrated and deployed to the other physical server that has availability to support the virtual resource. However, migration of a virtual resource from one physical server to another may lead to difficulties routing communications between virtual resources executing on separate physical servers.

To effectively manage migration of virtual resources across a number of physical servers, a physical server may host a virtual switch to forward packets to the virtual services that are deployed on the physical server. The virtual switches may be utilized in communication with a spine network switch, hosting a virtual endpoint database of the cloud computing network. When a virtual resource is migrated from a source server to destination server, the virtual switch associated with the destination server sends an communication with instructions to update to the spine network switch, which in response, sends a bounce notification to the source server. The virtual switch associated with the source server installs a bounce entry configured to redirect traffic intended for the virtual resource to the destination server. While utilizing a spine network switch to host a virtual endpoint database of the cloud computing network is advantageous for various reasons, utilizing the spine network switch suffers from some inefficiencies and has various limitations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes a method of utilizing virtual edge switches of cloud computing networks to send, receive, and store in respective virtual memory, associations between virtual resource endpoints and virtual edge switches for better convergence in virtual application centric infrastructure networks. The method includes receiving, by a first virtual switch hosted on a first virtual machine executing on a first computing device, an indication that a second virtual machine executing on the first computing device is hosting an application. Further, the method includes determining, by the first virtual switch, a destination address associated with the second virtual machine. The method may further include storing the destination address for the second virtual machine in association with the first virtual switch in a virtual memory associated with the first virtual machine. Further, the method may include generating an advertisement message including an indication of the destination address associated with the second virtual machine. The method may further include the first virtual switch causing the first computing device to send the advertisement message to a second computing device. The first computing device and the second computing device may be included in the same network.

After the advertisement message has been sent from the first computing device to the second computing device, the method may include the second computing device executing a third virtual machine that is hosting a second virtual switch. Further, the method includes receiving, from the first computing device, the advertisement message including the indication of the destination address for the second virtual machine running on the first computing device. The first virtual switch may be configured to route communication data received at the first computing device to the second virtual machine. Additionally, the method includes storing an association between the destination address for the second virtual machine and the first virtual switch in virtual memory associated with the third virtual machine.

Additionally, the techniques described herein may be performed by a system and/or device having non-transitory computer-readable media storing computer-executable instructions that, when executed by one or more processors, performs the method described above.

EXAMPLE EMBODIMENTS

Generally, a spine network switch is designed to forward communications from one leaf network switch (or virtual edge switch) running on a physical server within a cloud computing network to another left network switching running on another physical server in the same cloud computing network. The spine network switch may be executing on a virtual machine hosted on a physical server within the cloud computing network. The spine network switch may be in communication with a number of virtual edge switches executing on virtual machines hosted on respective physical servers that are within the cloud computing network, and may host a virtual endpoint database for the cloud computing network. The virtual endpoint database may be used by the spine network switch to reference destination addresses and facilitate forwarding of communications between the virtual machines hosted on the physical servers within the cloud computing network. A physical server in the cloud computing network may host a number of virtual machines. For example, a physical server may host one or more virtual machines executing applications ("virtual endpoint(s)") and/or a virtual machine executing a virtual edge switch configured to forward communications between the physical servers and to a desired virtual endpoint. The virtual edge switch may be configured to forward communications or packets to the virtual endpoints that are attached to the virtual edge switch.

In an example, a first virtual endpoint attached to a first virtual edge switch may generate communication data with a destination address of a second virtual endpoint attached to a second virtual edge switch. The first virtual edge switch may send communication data to the spine network switch, querying the virtual endpoint database for the destination address. The spine network switch then determines the virtual edge switch responsible for forwarding communication data to the virtual endpoint associated with the destination address and sends the information to the first virtual edge switch. The first virtual edge switch can then cause the corresponding physical server to send the communication to the physical server corresponding to the second virtual edge switch. When the communication is received by the second virtual edge switch, the second virtual edge switch forwards the to the virtual endpoint having the destination address specified by the communication.

Additionally, a physical server may be configured to determine that its resource utilization is reaching a threshold and may determine to migrate one or more virtual endpoints to other physical servers in the cloud computing network with sufficient availability of server resources to adequately support the virtual endpoint(s). When a virtual endpoint migrates from one physical server to another, virtual endpoint database of the network spine may be updated to ensure proper forwarding of communications between physical servers. In an example, a first virtual endpoint may migrate from a first physical server having a first virtual edge switch to a second physical server having a second virtual edge switch, and also in the cloud computing network. Once the first virtual endpoint spins-up or begins execution on a virtual machine hosted on the second physical server, the second virtual edge switch receives an indication of a destination address of the first virtual endpoint. The second virtual edge switch sends communication data to the spine network switch, indicating the destination address of the first virtual endpoint in association with the second virtual edge switch. The spine network switch will update the virtual endpoint database with the destination address of the first virtual endpoint in association with the second virtual edge switch, and in a case where the first virtual endpoint migrated from the first physical server to the second physical server, the spine network switch will overwrite the previous association between the destination address of the first virtual endpoint and the first virtual edge switch. Additionally, the spine network switch sends communication data to the first virtual edge switch instructing the first virtual edge switch to install a bounce entry, configured to redirect communication received at the first physical server and intended for the first virtual endpoint, to the second physical server that is now hosting the first virtual endpoint. However, because the spine network switch manages the virtual endpoint database that indicates on which physical server each virtual endpoint is executing, there may be high levels of communication traffic with the spine network switch resulting in increased latency. Additionally, communicating data packets between virtual endpoints via the spine network switch adds an extra hop in a communication path which increases latency in communications, and ultimately may not be necessary.

This disclosure describes techniques for virtual edge switches to maintain respective virtual endpoint databases such that virtual edge switches may determine, locally, a destination address of a destination virtual endpoint. Further, the virtual edge switches may be able to send communication data to other virtual edge switches without the extra hop of a spine network switch. According to the techniques and mechanisms described herein, each physical server in a cloud computing network will host a virtual edge switch and a virtual endpoint database containing the same virtual endpoint data as the spine network switch described above.

Upon receiving an indication of a virtual endpoint spinning-up on a physical server, the corresponding virtual edge switch updates the attached virtual endpoint database, generates an advertisement message containing the destination address of the virtual endpoint, and causes the physical server to send the advertisement message to all of the physical servers within the cloud computing network. Upon receiving an advertisement message on a physical server, the corresponding virtual edge switch updates the attached virtual endpoint database by storing an association between the destination address of the virtual endpoint and the virtual edge switch from which the advertisement message was sent. Thus, if a communication channel between a virtual edge switch and the spine network switch is interrupted, and any sort of data loss occurs, the virtual edge switch has access to the attached virtual endpoint database to determine a virtual edge switch responsible for forwarding communications to a virtual endpoint.

In some examples, a virtual machine hosted on a physical server and executing a virtual edge switch may include an allocated virtual memory configured as a virtual endpoint database attached to the virtual edge switch. The virtual endpoint database may contain destination addresses of all virtual endpoints executing across all physical servers in the cloud computing network, and an association between each destination address of a virtual endpoint and the corresponding virtual edge switch responsible for forwarding communications to the respective virtual endpoint. Thus, when a virtual endpoint desires to send communication data to a destination address, the corresponding virtual edge switch may query the attached virtual endpoint database to determine the virtual edge switch responsible for forwarding communications to the virtual endpoint having the destination address specified in the communication.

In order to maintain respective virtual endpoint databases associated with each virtual edge switch in the cloud computing network, a virtual edge switch that detects a virtual endpoint boot-up on its corresponding physical server generates and sends an advertisement message or discovery packet to all other virtual edge switch's in the cloud computing network, indicating an association between the virtual endpoint and the virtual edge switch. A virtual edge switch may receive an indication of a virtual endpoint boot-up following a number of actions. For example, a virtual edge switch may receive an indication of a virtual endpoint boot-up when the virtual endpoint begins operation for the first time in the cloud computing network. Additionally, or alternatively, a virtual edge switch may receive an indication of a virtual endpoint boot-up when the virtual endpoint is migrated from a separate physical server within the cloud computing network to the physical server hosting the virtual edge switch. The advertisement message contains the destination address of the virtual endpoint that is booting-up, and may contain other identifier information associated with the virtual machine executing the virtual endpoint, such as but not limited to Level 2 and Level 3 domain information, for example, a Media Access Control (MAC) address, an Internet Protocol (IP) address, a Virtual Route Forwarding (VRF) identifier, a VXLAN Instance ID (VNID), a bridge domain (BD) identifier, an Endpoint Group (EPG) identifier, and a Tunnel Endpoint (TEP) identifier. The information contained in the advertisement message may be in a Type-Length-Value (TLV) encoded format, allowing for additional information to be easily added on if needed.

In an example cloud computing network, a number of physical servers may be in communication with each other.

For example, a first physical server ("host #1") may host a virtual machine executing an application ("virtual endpoint #1") and a virtual machine executing a virtual edge switch ("virtual edge switch #1"). Additionally, a second physical server ("host #2") may host a virtual machine executing an application ("virtual endpoint #2") and a virtual machine executing a virtual edge switch ("virtual edge switch #2"). Virtual edge switch #1 may maintain an attached virtual endpoint database ("endpoint database #1"), and virtual edge switch #2 may maintain an attached virtual endpoint database ("endpoint database #2"). In the above example, endpoint database #1 contains an association between virtual endpoint #1 and virtual edge switch #1, indicating that virtual edge switch #1 is responsible for forwarding communications having a destination address corresponding to the destination address of virtual endpoint #1, and an association between virtual endpoint #2 and virtual edge switch #2. Additionally, endpoint database #2 contains the same records of associations between virtual endpoints and virtual edge switches as endpoint database #1.

In some examples, when a new virtual machine executing an application ("virtual endpoint #3") boots-up on host #1, virtual edge switch #1 receives an indication that virtual endpoint #3 is booting up on host #1. Virtual edge switch #1 then determines the destination address (MAC address, IP address, etc.) associated with virtual endpoint #3, and stores, in endpoint database #1, an association between the destination address of virtual endpoint #3 and virtual edge switch #1. Additionally, virtual edge switch #1 generates an advertisement message indicating the association between the destination address of virtual endpoint #3 and virtual edge switch #1. Virtual edge switch #1 causes host #1 to send the advertisement message to all other physical servers in the cloud computing network, for example, host #2. Host #2, hosting virtual edge switch #2, receives the advertisement message. Virtual edge switch #2 then stores, in endpoint database #2, an association between the destination address of virtual endpoint #3 and virtual edge switch #1.

In some examples, host #1 may determine that its resource utilization is reaching a threshold and may desire to migrate virtual endpoint #1 to another physical server, for example, host #2. Upon migration of virtual endpoint #1 to host #2, virtual endpoint #1 boots-up on host #2, and virtual edge switch #2 receives an indication that virtual endpoint #1 is booting up on host #2. Virtual edge switch #2 then determines the destination address associated with virtual endpoint #1, and updates endpoint database #2, by storing an association between the destination address of virtual endpoint #3 and virtual edge switch #2. Additionally, or alternatively, virtual edge switch #2 may query endpoint database #2 for a previous association between the destination address of virtual endpoint #1 and a virtual edge switch within the cloud computing network. In this example, virtual edge switch #2 identifies the previous association between the destination address of virtual endpoint #1 and virtual edge switch #1 and removes the association from endpoint database #2. Additionally, virtual edge switch #2 generates an advertisement message indicating the association between the destination address of virtual endpoint #1 and virtual edge switch #2. Virtual edge switch #2 causes host #2 to send the advertisement message to all other physical servers in the cloud computing network, for example, host #1. Host #1, hosting virtual edge switch #1, receives the advertisement message. Virtual edge switch #1 then stores, in endpoint database #1, an association between the destination address of virtual endpoint #1 and virtual edge switch #2. Additionally, or alternatively, virtual edge switch #1 may query endpoint database #1 for a previous association between the destination address of virtual endpoint #1 and a virtual edge switch within the cloud computing network. In this example, virtual edge switch #1 identifies the previous association between the destination address of virtual endpoint #1 and virtual edge switch #1 and removes the association from endpoint database #1.

As described herein, a virtual resource can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to communicating endpoint information among virtual switches in a cloud computing network. For instance, the techniques described herein may achieve faster convergence during migration of virtual endpoints from one physical server to another and result in faster updating of next-hop information for the endpoint that moved on all virtual edge switches in the cloud computing network. By maintaining the next-hop information for every virtual endpoint at each virtual edge switch, data loss occurring because of a connectivity loss to the spine network switch, and an unnecessary hop of the communications to the old virtual edge switch in the case where a bounce entry is installed is avoided.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
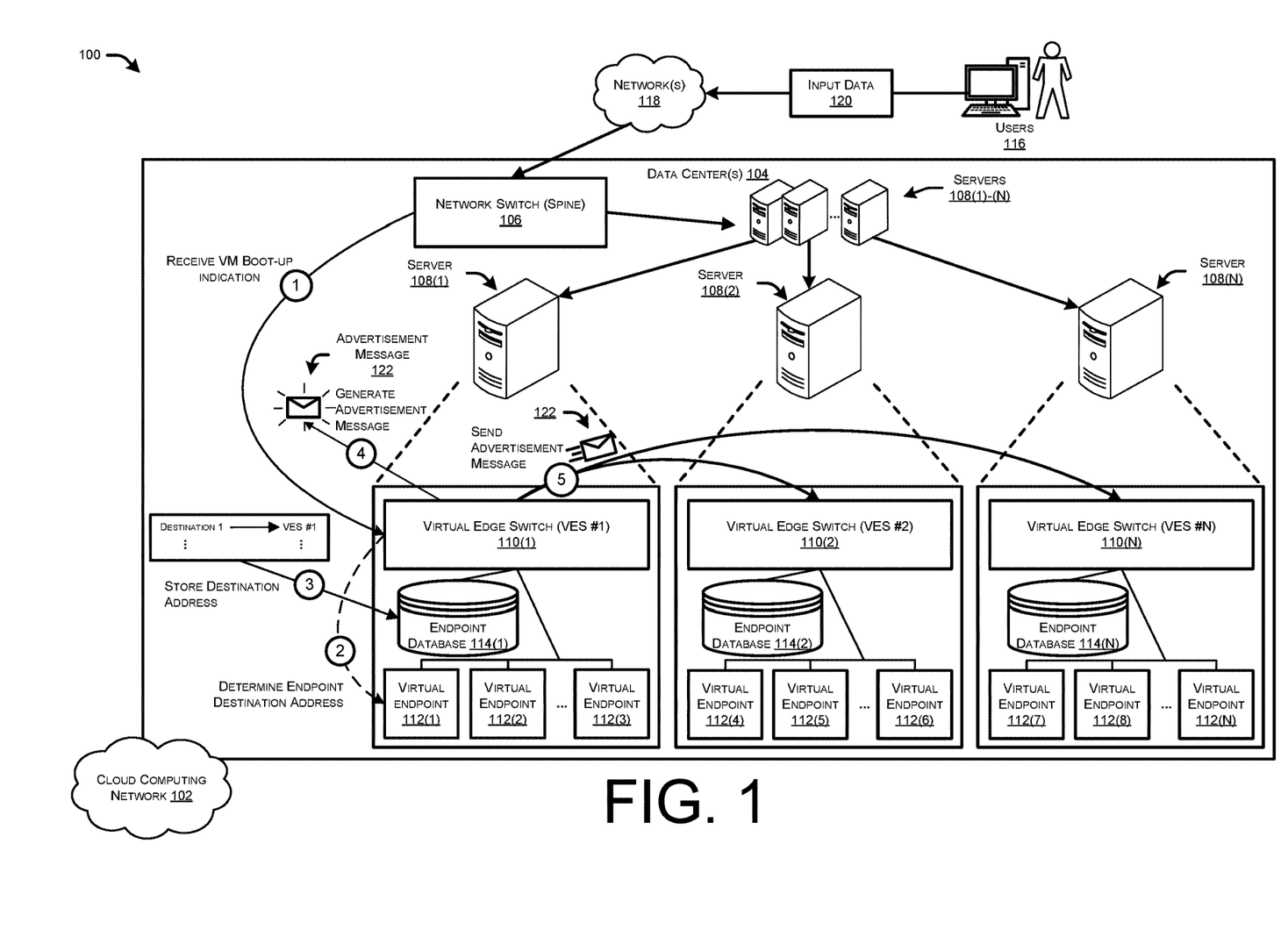
FIG. 1 illustrates a system-architecture diagram of an example flow for a virtual edge switch component communicating with other virtual edge switch components to update respective virtual endpoint databases storing virtual resource destination data in association with virtual edge switches.

FIG. 1 illustrates a system-architecture diagram 100 of an example flow for sending advertisement messages indicating new endpoint information within a cloud computing network 102. The cloud computing network 102 may comprise one or more data centers 104 that include various networking devices, such as, spine network switches 106 and physical servers 108(1)-(N) where N is any integer greater than "1." In some examples, the data center(s) 104 may be located across geographic areas, and the cloud computing network 102 may be a distributed network through which users (often customers) may interact via user devices to manage or otherwise interact with service provided by the cloud computing network 102.

The cloud computing network 102 may provide on-demand availability of computing system resources of physical server(s) 108(1)-(N), such as data storage, computing power (e.g., CPU, GPU, etc.), networking, databases, etc., without direct active management by users. In some examples, the cloud computing network 102 may be managed and maintained by a service provider such that users do not have to invest in and maintain the computing infrastructure for their computing resource needs. Generally, a user may be provided access to, or allocated use of, a portion of the computing resources of physical server(s) 108(1)-(N) in the cloud computing network 102. The cloud computing network 102 may scale, such as by spinning up resources or spinning down resources, based on demand for the individual users. The portions of the cloud computing network 102 may be allocated using hardware virtualization such that portions of the cloud computing network 102 can be configured and managed by the user (e.g., security configuration, load balancing configuration, etc.). However, the cloud computing network 102 need not be managed by a service provider, and can be managed by any entity, including the user themselves that run the applications or services.

In some examples, physical server(s) 108(1)-(N) may host one or more virtual machines. Each virtual machine may be configured to execute one of various operations and act as one or more virtual components for the cloud computing network 102, such as, for example, a virtual edge switch 110(1)-(N) and/or a virtual endpoint 112(1)-(N) where N is any integer greater than "1." In some examples, the physical server(s) 108(1)-(N) may host any number of virtual machines. In some examples, each of the physical server(s) 108(1)-(N) in the cloud computing network 102 may host at least one virtual machine executing a virtual edge switch 110 and one or more virtual machines executing user applications resulting in respective virtual endpoints 112(1)-(N).

In some examples, a virtual machine may be configured to execute one of various operations and act as a virtual edge switch 110. A virtual edge switch may be configured to forward communications between physical servers 108(1)-(N) of the cloud computing network. For example, virtual edge switch 110(1) may be configured to route communications between server 108(1) and other servers 108(2)-(N) within the cloud computing network. Additionally, or alternatively, a virtual machine executing a virtual edge switch 110(1) may include an allocated virtual memory configured as a virtual endpoint database 114(1) attached to the respective virtual edge switch 110(1). The virtual endpoint database 114(1) may be configured to store destination addresses of all virtual endpoints 112(1)-(N) executing across all physical servers 108(1)-(N) in the cloud computing network 102, and an association between each destination address of a virtual endpoint 112 and the corresponding virtual edge switch 110.

Generally, the number of virtual endpoints 112(1)-(N) may scale based on a number of users 116 interacting with the cloud computing network. The users 116 may comprise one or more of individual users, groups of users, organizations, businesses, or other entities that interact with the cloud computing network 102 via respective user devices. The user devices may be any type of computing device capable of connecting to the cloud computing network 102 via a suitable data communications network 118 such as, but not limited to, a laptop or desktop computer, a tablet computing device, a server computer, a television, or a mobile telephone. Administrative users employed by the operator of the cloud computing network 102, such as administrators managing the operation of the cloud computing network 102, might also connect with, manage, and utilize resources provided by the service provider network 102 in a similar fashion.

The users 116 may provide input data 120 via the network(s) 118 to interact with the service that is supported by the virtual endpoints 112(1)-(N) running on the servers 108(1)-(N). For example, the users 116 may submit requests to process data, retrieve data, store data, and so forth such that virtual machines hosting the virtual endpoints 112(1)-(N) are spun up or spun down to process the requests based on demand.

When a virtual endpoint 112(1) desires to send communication data having a destination address, the communication is forwarded to the attached virtual edge switch 110(1). In some examples, when the destination address matches the destination address of a virtual endpoint 112(1)-(3) attached to the virtual edge switch 110(1), the virtual edge switch 110(1) may forward the communication to the corresponding virtual endpoint 112(1)-(3). Additionally, or alternatively, when the destination address does not match the destination address of a virtual endpoint 112(1)-(3) attached to the virtual edge switch 110(1), the virtual edge switch 110(1) may query the attached virtual endpoint database 114(1) to determine the virtual edge switch 110(2)-(N) configured to forward communications to the virtual endpoint 112(4)-(N) having the destination address specified in the communication, for example, the virtual edge switch 110(1) may determine that the destination address specified in the communication matches the destination address of virtual endpoint 112(4) attached to virtual edge switch 110(2). Once the virtual edge switch 110(1) has determined that virtual edge switch 110(2) is configured to forward communications to the desired virtual endpoint 112(4), the virtual edge switch 110(1) may then cause the physical server 108(1) to send the communication to the physical server 108(2) hosting the recipient virtual edge switch 110(2).

In order to maintain respective virtual endpoint databases 114(1)-(N) associated with each virtual edge switch 110(1)-(N) in the cloud computing network, a virtual edge switch 110 that detects a virtual endpoint 112 boot-up on its corresponding physical server 108 must communicate this information with all other virtual edge switches 110 in the cloud computing network. For example, a virtual edge switch 110(1) may detect a virtual endpoint 112(1) boot-up on its corresponding physical server 108(1). Additionally, or alternatively, the spine network switch 106 may send an indication of the virtual endpoint 112(1) boot-up to the virtual edge switch 110(1). Following detection or indication of the virtual endpoint 112(1) boot-up, the virtual edge switch 110(1) generates an advertisement message 122 (also referred to as a "discovery packet") and causes the physical server 108(1) to send the advertisement message 122 to all other physical servers 108(2)-(N) hosting virtual edge switches 110(2)-(N) in the cloud computing network 102, the advertisement message 122 indicating an association between the virtual endpoint 112(1) and the virtual edge switch 110(1). Each virtual edge switch 110(2)-(N) receiving the advertisement message 122 updates a respective virtual endpoint database 114(2)-(N) attached to each virtual edge switch 110(2)-(N) receiving the advertisement message 122.

A virtual edge switch 110(1)-(N) may receive an indication of a virtual endpoint boot-up following a number of actions. In some examples, a virtual edge switch 110 may receive an indication of a virtual endpoint 114 boot-up when the virtual endpoint 112 begins operation for the first time in the cloud computing network 102. Additionally, or alternatively, a virtual edge switch 110(1) may receive an indication of a virtual endpoint 112(1) boot-up when the virtual endpoint 112(1) is migrated from a physical server 108(2)-(N) that is separate from the physical server 108(1) hosting the virtual edge switch 110(1) that receives the indication that the virtual endpoint 112(1) is booting-up on the physical server 108(1).

The advertisement message 122 contains the destination address of the virtual endpoint 112(1) that is booting-up on a physical server 108(1). Additionally, or alternatively, the advertisement message 122 may also contain identifier information associated with the virtual machine executing the virtual endpoint 112(1), such as but not limited to, for example, a Media Access Control (MAC) address, an Internet Protocol (IP) address, a Virtual Route Forwarding (VRF) identifier, a VXLAN Instance ID (VNID), a bridge domain (BD) identifier, an Endpoint Group (EPG) identifier, and a Tunnel Endpoint (TEP) identifier. The information contained in the advertisement message 122 may be in a Type Length Values (TLV) format, allowing for additional information to be easily added on if needed.

At "1," the virtual edge switch 110(1) may receive communication data from the spine network switch 106 indicating that a virtual machine is booting-up on the physical server 108(1) that is hosting the virtual edge switch 110(1).

At "2," the virtual edge switch 110(1) may determine the destination address associated with the virtual endpoint 112(1) executing on the virtual machine that has just booted-up. Additionally, or alternatively, the virtual edge switch 110(1) may determine additional identifier information associated with the virtual machine executing the virtual endpoint 112(1), such as but not limited to a MAC address, an IP address, a VRF identifier, a VNID, a BD identifier, an EPG identifier, and/or a TEP identifier.

At "3," the virtual edge switch 110(1) may store the destination address associated with the virtual endpoint 112(1) in the attached virtual endpoint database 114(1). Additionally, or alternatively, the virtual edge switch 110(1) may store an indication of an association between the destination address associated with the virtual endpoint 112(1) and the virtual edge switch 110(1), indicating that the virtual edge switch 110(1) is configured to forward communications to the virtual endpoint 110(1). Additionally, or alternatively, the virtual edge switch may also store the additional identifier information associated with the virtual machine executing the virtual endpoint 112(1) in a TLV encoded format.

At "4," the virtual edge switch 110(1) may generate an advertisement message 122 to transmit to all other virtual edge switches 110(2)-(N) in the cloud computing network 102. In some examples, the advertisement message 122 may include the destination address associated with the virtual endpoint 112(1). Additionally, or alternatively, the advertisement message 122 may include an indication of an association between the destination address associated with the virtual endpoint 112(1) and the virtual edge switch 110(1), indicating that the virtual edge switch 110(1) is configured to forward communications to the virtual endpoint 112(1). Additionally, or alternatively, the advertisement message 122 may include the additional identifier information associated with the virtual machine executing the virtual endpoint 112(1) in a TLV encoded format.

At "5," the virtual edge switch 110(1) may cause the physical server 108(1) to send the advertisement message 122 to all other physical servers 108(2)-(N) hosting virtual edge switches 110(2)-(N) in the cloud computing network.

Figure 2:
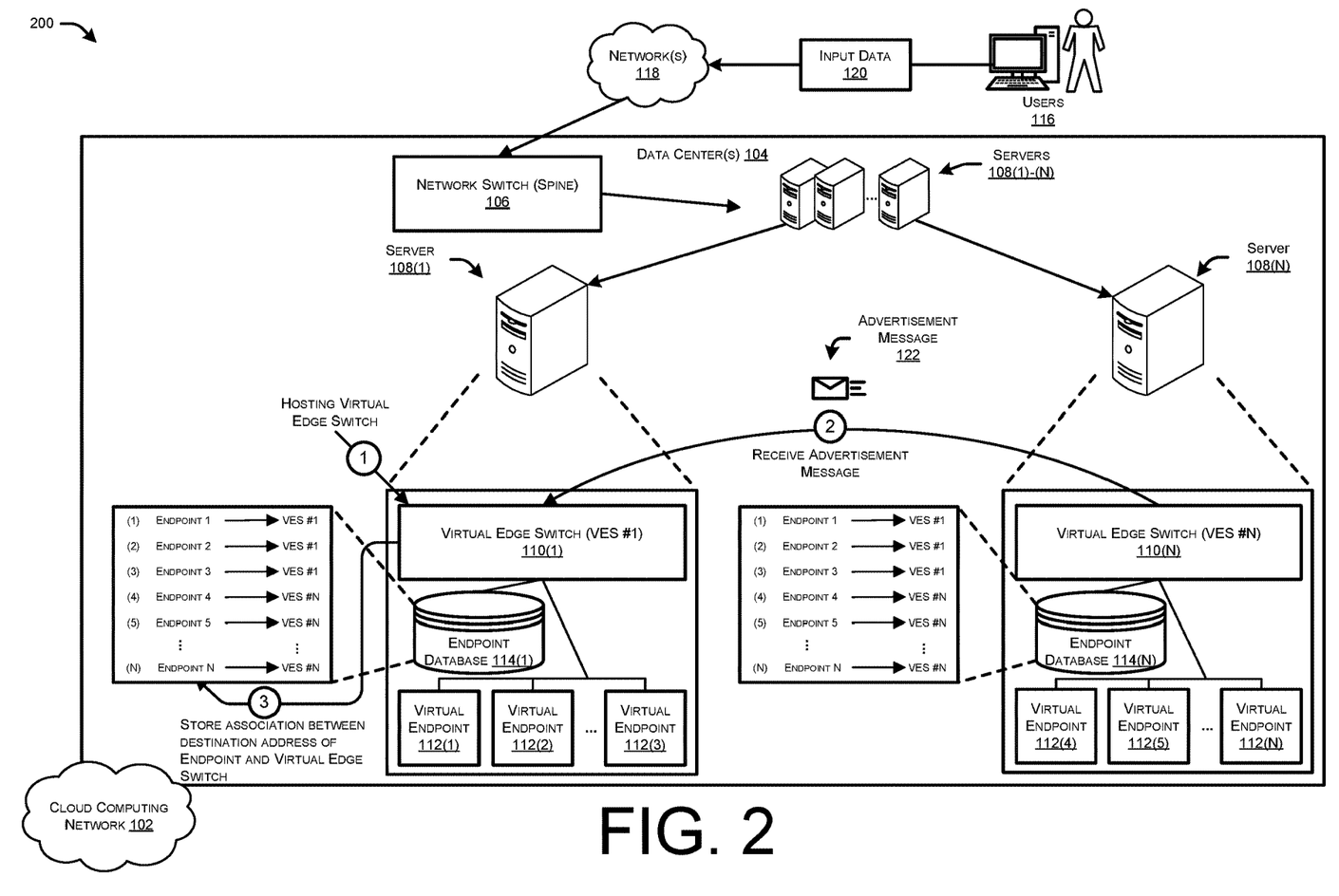
FIG. 2 illustrates a system-architecture diagram of an example flow for a virtual edge switch component receiving an advertisement message from another virtual edge switch within the network and updating a respective virtual database by storing virtual resource destination data in association with the other virtual edge switch.

FIG. 2 illustrates a system-architecture diagram 200 of an example flow for a virtual edge switch 110(1) receiving an advertisement message 122 from another virtual edge switch 110(N) indicating a new virtual endpoint 112(N) has spun-up within a cloud computing network 102, and updating a respective endpoint database 114(1) attached to the virtual edge switch 110(1) by storing the destination address of the virtual endpoint 110(N) in association with the virtual edge switch 110(N).

A physical server 108 hosting a virtual edge switch 110 may receive an advertisement message 122 from another physical server 108 hosting a virtual edge switch 110 in the cloud computing network 102 for various reasons. In some examples, the advertisement message 122 may be sent in response to a virtual machine spinning-up on a physical server 108 and hosting an application, forming a virtual endpoint 112. Additionally, or alternatively, the advertisement message 122 may be sent in response to a virtual endpoint 112 migrating from one physical server 108 in the cloud computing network 102 to a separate physical server 108 within the cloud computing network 102. The advertisement message 122 may include various information, such as, but not limited to, an indication of an association between the destination address of a virtual endpoint 112 and a virtual edge switch 110 configured to forward communications from other physical servers 108 in the cloud computing network 102 to the virtual endpoint 112.

At "1," a virtual machine hosted on a physical server 108(1) executes a virtual edge switch 110(1). In examples, the virtual edge switch 110(1) may be configured to route communications received from other virtual edge switches 110(2)-(N) to a virtual endpoint 112(1)-(3) having a destination address specified by the received communication. Additionally, or alternatively, the virtual edge switch 110(1) may be configured to maintain a virtual endpoint database 114(1) attached to the virtual edge switch 110(1).

At "2," the physical server 108(1) hosting the virtual edge switch 110(1) receives an advertisement message 122 from another physical server 108(N) hosting a virtual edge switch 110(N) in the cloud computing network 102. In some examples, the advertisement message 122 may include the destination address associated with a virtual endpoint 112(N). Additionally, or alternatively, the advertisement message 122 may include an indication of an association between the destination address associated with the virtual endpoint 112(N) and the virtual edge switch 110(N), indicating that the virtual edge switch 110(N) is configured to forward communications to the virtual endpoint 112(N). Additionally, or alternatively, the advertisement message 122 may include additional identifier information associated with the virtual machine executing the virtual endpoint 112(N), such as but not limited to a MAC address, an IP address, a VRF identifier, a VNID, a BD identifier, an EPG identifier, and/or a TEP identifier, encoded in a TLV format.

At "3," the virtual edge switch 110(1) may store information included in the advertisement message 122 in the virtual endpoint database 114(1) attached to the virtual edge switch 110(1). In some examples, the virtual edge switch 110(1) may store the destination address associated with a virtual endpoint 112(N). Additionally, or alternatively, the virtual edge switch 110(1) may store an indication of an association between the destination address associated with the virtual endpoint 112(N) and the virtual edge switch 110(N), indicating that the virtual edge switch 110(N) is configured to forward communications to the virtual endpoint 112(N). Additionally, or alternatively, the virtual edge switch 110(N) may store additional identifier information associated with the virtual machine executing the virtual endpoint 112(N), such as but not limited to a MAC address, an IP address, a VRF identifier, a VNID, a BD identifier, an EPG identifier, and/or a TEP identifier, encoded in a TLV format.

Figure 3:
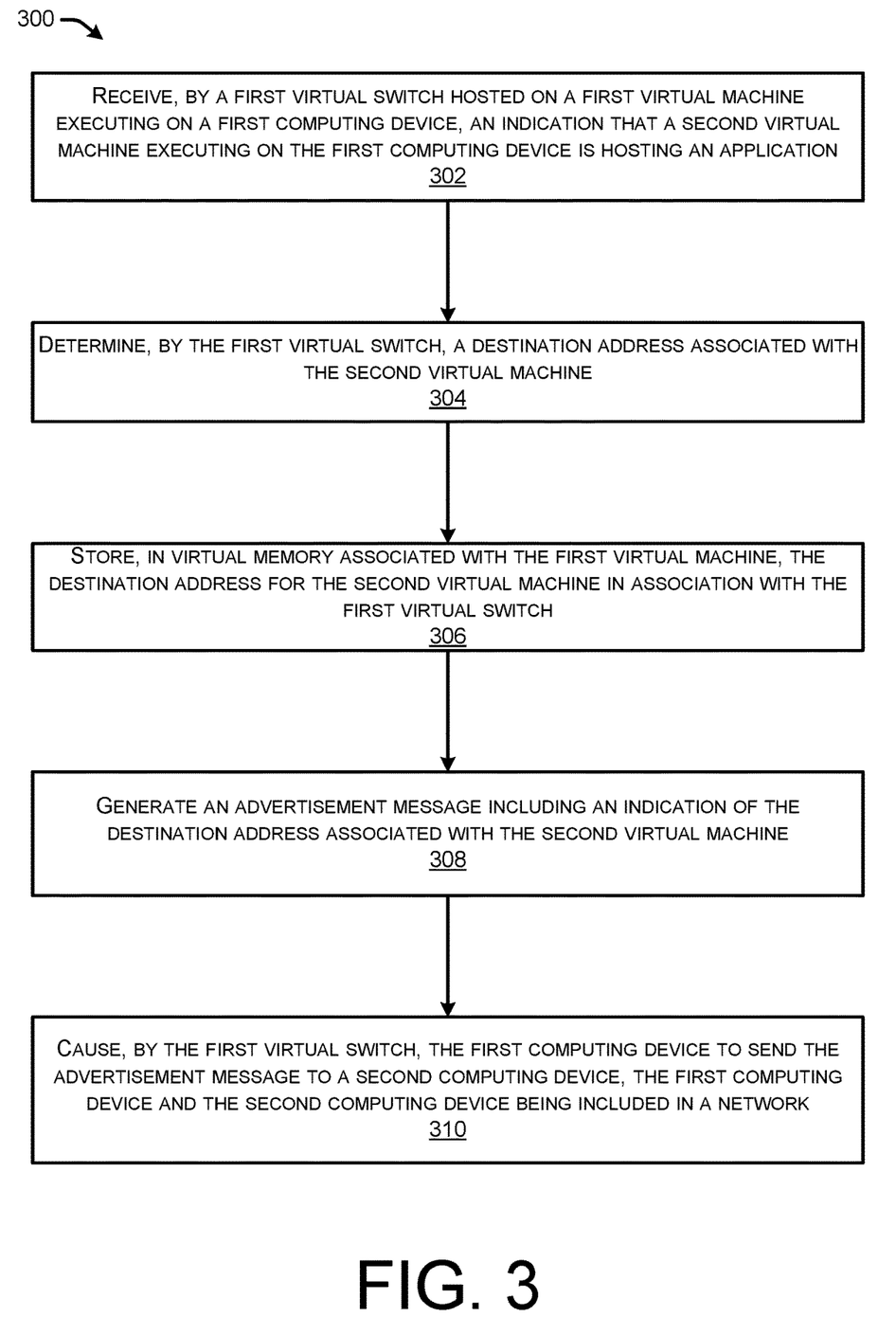
FIG. 3 illustrates a flow diagram of an example method for virtual edge switches of a cloud computing network to identify a new virtual resource being hosted on a corresponding physical server and send an advertisement message indicating an association between the virtual resource destination data and the virtual edge switch.
Figure 4:
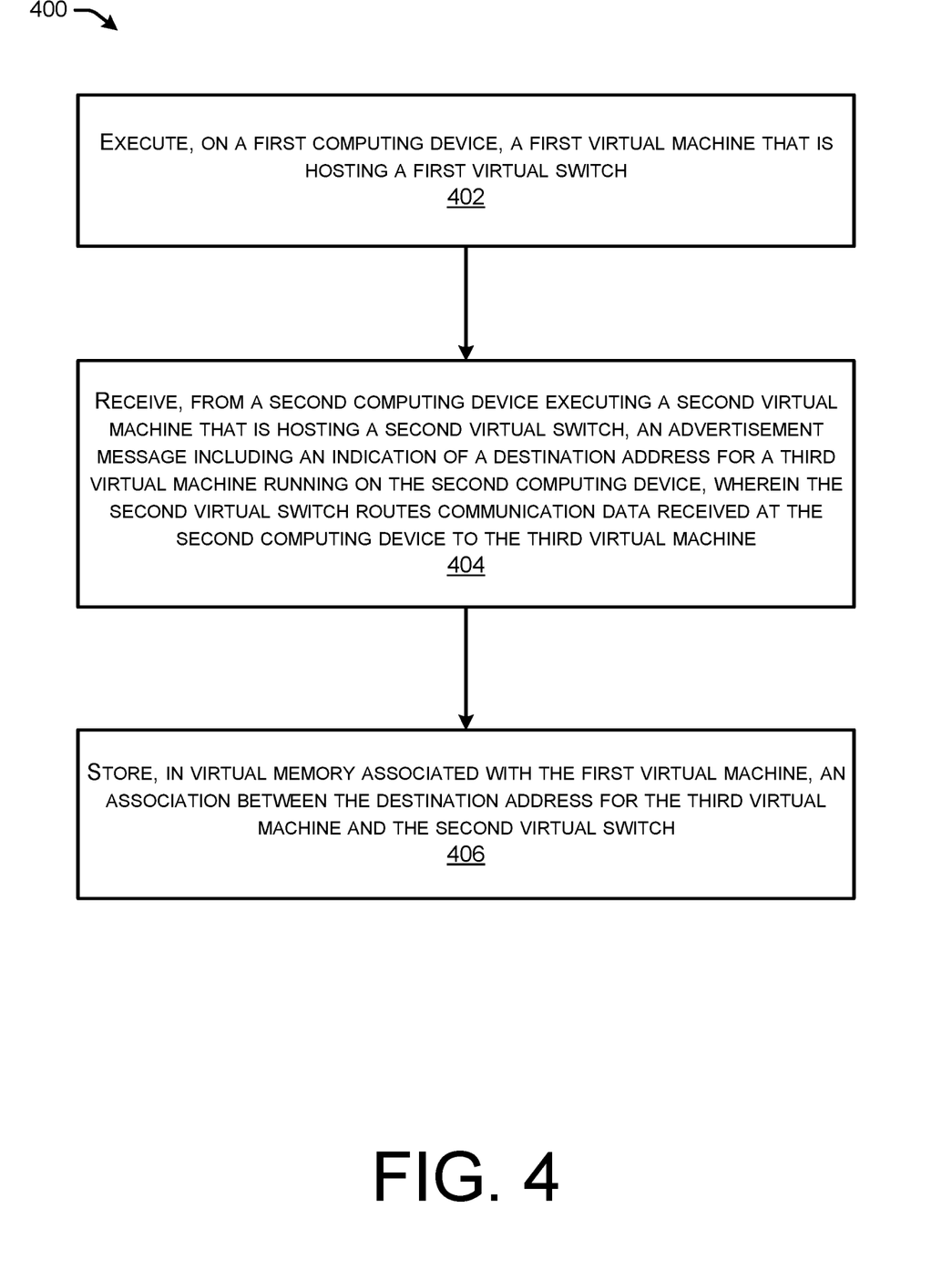
FIG. 4 illustrates a flow diagram of an example method for a virtual edge switch component of a cloud computing network to receive an advertisement message and store an association between a virtual resource destination and a virtual edge switch.

FIGS. 3 and 4 illustrate flow diagrams of example methods 300 and 400 and that illustrate aspects of the functions performed at least partly by the cloud computing network 102 as described in FIGS. 1 and 2. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for virtual edge switches 110 of a cloud computing network 102 to identify a new virtual endpoint 112 being hosted on a corresponding physical server 108 and send an advertisement message 122 indicating an association between the destination address of the virtual endpoint 112 and the virtual edge switch 110 configured to forward communications to the virtual endpoint 112. In some examples, the method 300 may be performed by a system comprising one or more processors and one or more non-transitory computer-readable media storing computer-executable instructions that, when executed by the one or more processors, cause the one or more processors to perform the method 300.

At 302, a first virtual switch 110(1) hosted on a first virtual machine executing on a first computing device 108(1) may receive an indication that a second virtual machine executing on the first computing device 108(1) is hosting an application, forming a virtual endpoint 112(1).

At 304, the first virtual switch 110(1) may determine a destination address associated with the second virtual machine. Additionally, or alternatively, the virtual edge switch 110(1) may determine additional identifier information associated with the virtual machine executing the virtual endpoint 112(1), such as but not limited to a MAC address, an IP address, a VRF identifier, a VNID, a BD identifier, an EPG identifier, and/or a TEP identifier.

At 306, the first virtual switch 110(1) may store the destination address for the second virtual machine in association with the first virtual switch 110(1) in virtual memory associated with the first virtual machine. For instance, the first virtual switch 110(1) may store the destination address associated with the virtual endpoint 112(1) in a virtual endpoint database 114(1) attached to the first virtual switch 110(1).

At 308, the first virtual switch 110(1) may generate an advertisement message 122 including an indication of the destination address of the virtual endpoint 112(1) associated with the first virtual switch 110(1).

The advertisement message 122 may include an indication of an association between the destination address associated with the virtual endpoint 112(1) and the virtual edge switch 110(1), indicating that the virtual edge switch 110(1) is configured to forward communications to the virtual endpoint 112(1). Additionally, or alternatively, the advertisement message 122 may include the additional identifier information associated with the virtual machine executing the virtual endpoint 112(1) in a TLV encoded format.

At 310, the first virtual switch 110(1) may cause the first computing device 108(1) to send the advertisement message 122 to a second computing device 108(2)-(N) in the cloud computing network 102.

FIG. 4 illustrates a flow diagram of an example method 400 for a virtual edge switch 110 of a cloud computing network 102 to receive an advertisement message 122 and store an association between a destination address of a virtual endpoint 112 destination and a virtual edge switch 110 in a virtual endpoint database 114 attached to the virtual edge switch 110.

At 402, a first computing device 108(1) executes a first virtual machine that is hosting a first virtual switch 110(1). In some examples, the first virtual switch 110(1) may be a virtual edge switch 110(1) configured to forward communications received from additional virtual edge switches 110(2)-(N) within the cloud computing network. Additionally, or alternatively, the virtual edge switch 110(1) may be configured to maintain a virtual endpoint database 114(1) attached to the virtual switch 110(1).

At 404, the first computing device 108(1) receives an advertisement message 122 from a second computing device 108(N) that is hosting a second virtual switch 110(N). The advertisement message 122 may include an indication of a destination address for a third virtual machine hosted on the second computing device 108(N). In some examples, the third virtual machine may be executing an application and form a virtual endpoint 112(N). In some examples, the second virtual switch 110(N) may be configured to forward communication data received at the second communication device 108(N) to the third virtual machine (also referred to as the virtual endpoint 112(N)).

The advertisement message 122 may include an indication of an association between the destination address associated with the virtual endpoint 112(N) and the virtual edge switch 110(N), indicating that the virtual edge switch 110(N) is configured to forward communications to the virtual endpoint 112(N). Additionally, or alternatively, the advertisement message 122 may include additional identifier information associated with the third virtual machine executing the virtual endpoint 112(N) in a TLV encoded format.

At 406, the first virtual switch 110(1) may store an association between the destination address for the third virtual machine (also referred to as the virtual endpoint 112(N)) and the second virtual switch 110(N) in the virtual endpoint database 114(N) attached to the first virtual switch 110(1). Additionally, or alternatively, the first virtual switch 110(1) may store the additional identifier information associated with the third virtual machine executing the virtual endpoint 112(N) in a TLV encoded format.

Figure 5:
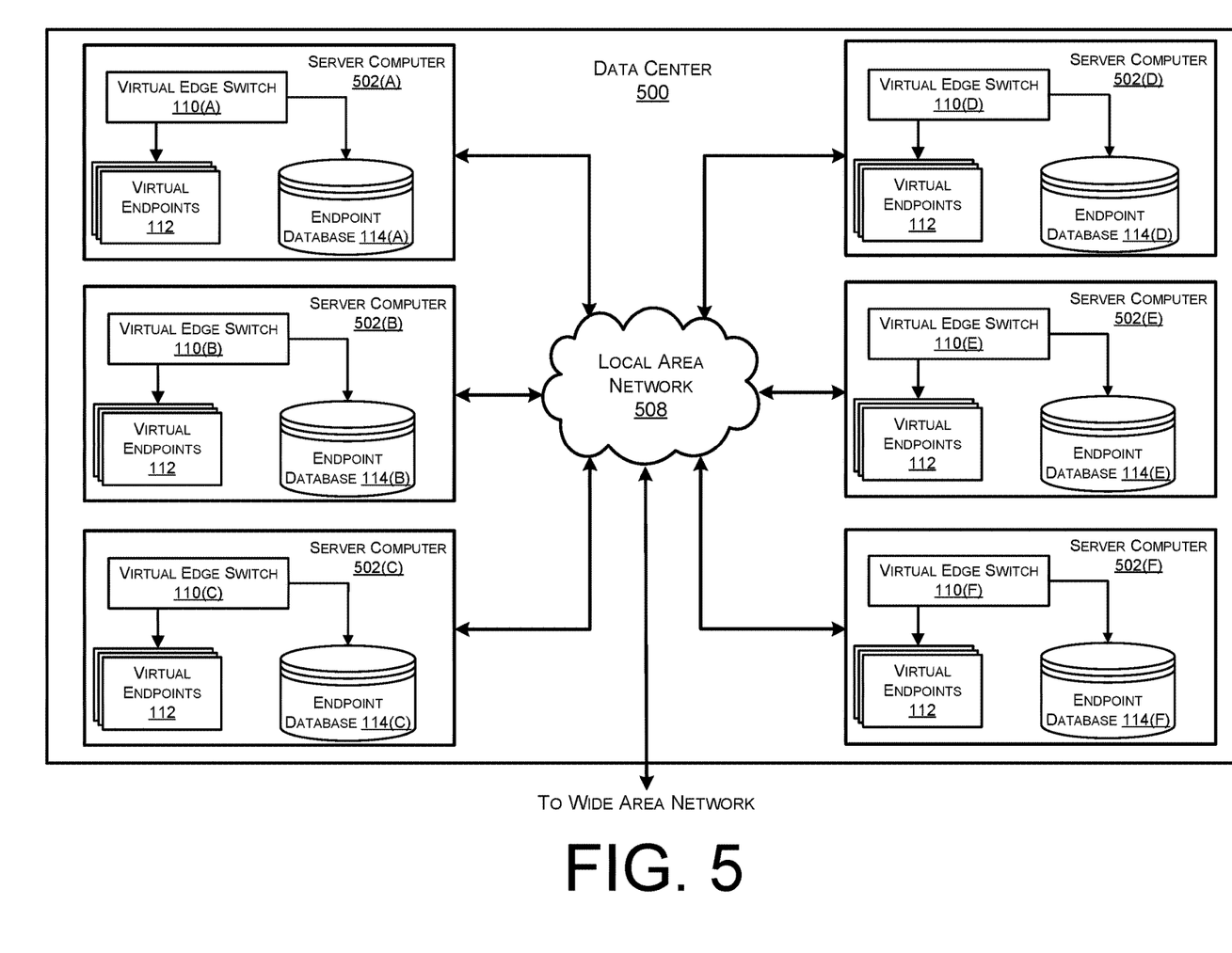
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502E (which might be referred to herein singularly as "a server computer 502" or in the plural as "the server computers 502") for providing computing resources. In some examples, the server computers 502 may include, or correspond to, the servers 108 described herein.

The server computers 502 can be standard tower, rack-mount, or blade server computers configured appropriately for providing the computing resources described herein. As mentioned above, the computing resources provided by the cloud computing network 102 can be data processing resources such as VM instances or hardware computing systems, database clusters, computing clusters, storage clusters, data storage resources, database resources, networking resources, and others. Some of the servers 502 can also be configured to execute a resource manager capable of instantiating and/or managing the computing resources. In the case of VM instances, for example, the resource manager can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502E in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute one or more virtual endpoints 112 that support a service or application provisioned across a set or cluster of servers 502. The virtual endpoints 112 on each server computer 502 may support a single application or service, or multiple applications or services (for one or more users).

In some instances, the cloud computing network 102 may provide computing resources, like application containers, VM instances, and storage, on a permanent or an as-needed basis. Among other types of functionality, the computing resources provided by the cloud computing network 102 may be utilized to implement the various services described above. The computing resources provided by the cloud computing network 102 can include various types of computing resources, such as data processing resources like application containers and VM instances, data storage resources, networking resources, data communication resources, network services, and the like.

Each type of computing resource provided by the cloud computing network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network 102 can also be configured to provide other types of computing resources not mentioned specifically herein.

The computing resources provided by the cloud computing network 102 may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 5.

Figure 6:
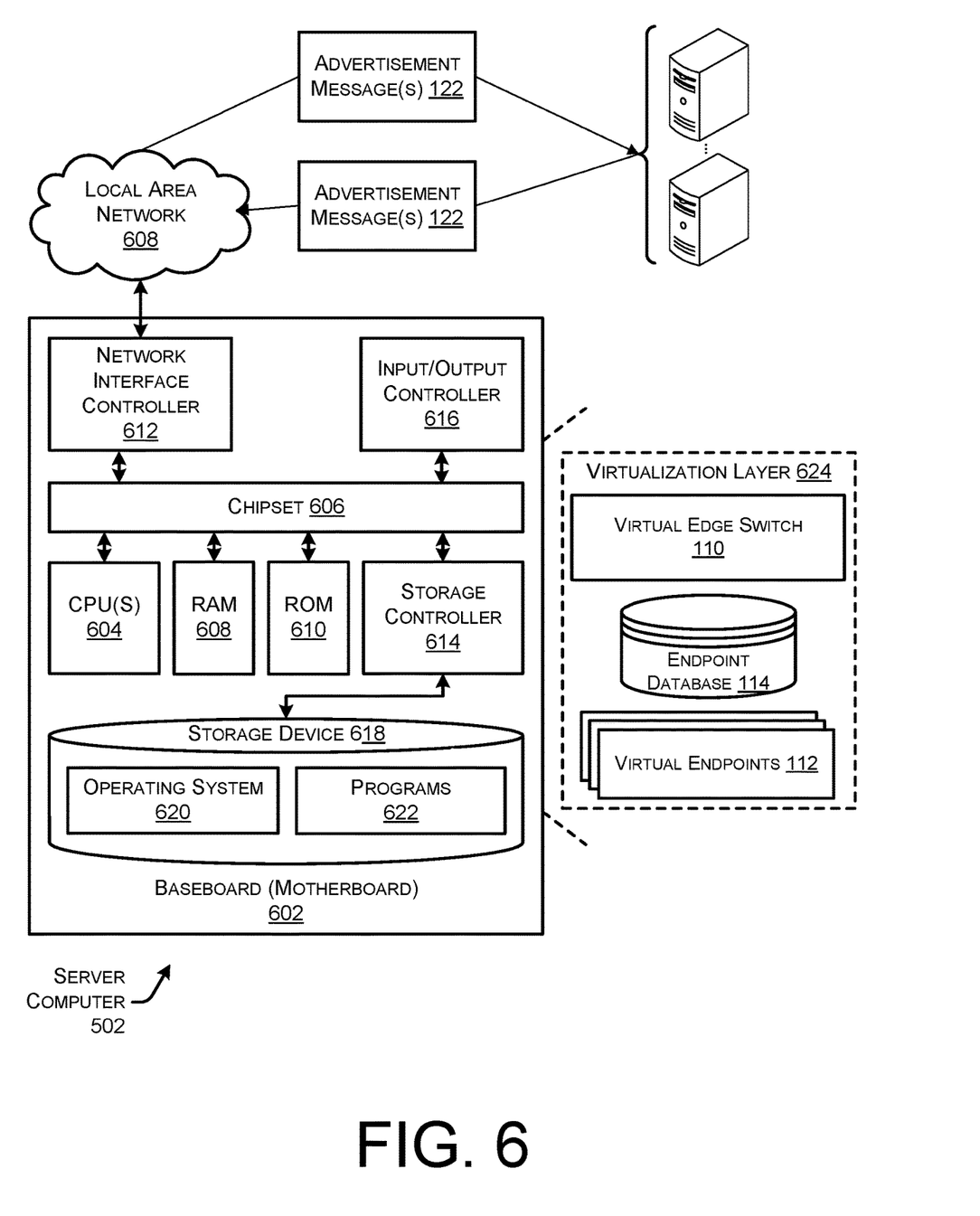
FIG. 6 is a computer architecture diagram showing an illustrative computer hardware architecture for implementing a server device that can be utilized to implement aspects of the various technologies presented herein.

FIG. 6 shows an example computer architecture for a server computer 502 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 502 may, in some examples, correspond to a physical server 108 described herein.

The computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 602 can operate in a networked environment using logical connections to remote computing devices and computer systems through a network, such as the network 508. The chipset 606 can include functionality for providing network connectivity through a NIC 612, such as a gigabit Ethernet adapter. The NIC 612 is capable of connecting the computer 502 to other computing devices over the network 508 (or 118). It should be appreciated that multiple NICs 612 can be present in the computer 502, connecting the computer to other types of networks and remote computer systems.

The computer 502 can be connected to a storage device 618 that provides non-volatile storage for the computer. The storage device 618 can store an operating system 620, programs 622, and data, which have been described in greater detail herein. The storage device 618 can be connected to the computer 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 618 by detecting the physical states or characteristics of one or more particular locations within the physical storage units.

In addition to the mass storage device 618 described above, the computer 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 502. In some examples, the operations performed by the cloud computing network 102, and or any components included therein, may be supported by one or more devices similar to computer 502. Stated otherwise, some or all of the operations performed by the cloud computing network 102, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 502.

In one embodiment, the storage device 618 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regard to FIGS. 1-5. The computer 502 can also include computer-readable storage media having instructions stored thereupon for performing any of the other computer-implemented operations described herein.

The computer 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

The server computer 502 may support a virtualization layer 624, such as one or more virtual endpoints 112 executing on the server computer 502. In some examples, the virtualization layer 624 may be supported by a hypervisor that provides one or more virtual machines running on the server computer 502 to perform functions described herein. The virtualization layer 624 may generally support a virtual resource that performs at least portions of the techniques described herein. The virtual edge switch 110 may send and receive various data and provide it to components. For instance, the virtual edge switch 110 may receive an advertisement message 122 containing data indicating the virtual edge switch 110 store an association between a virtual endpoint and a virtual edge switch in a virtual endpoint database 114 associated with the virtual edge switch 110.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A first computing device comprising:
   one or more processors; and
   one or more non-transitory computer-readable media storing computer-executable instructions that, when executed by the one or more processors, cause the one or more processors to perform operations comprising:
   executing a first virtual machine that is hosting a first virtual switch;
   receiving, from a second computing device executing a second virtual machine that is hosting a second virtual switch, an advertisement message including an indication of a destination address for a first virtual endpoint that is hosted on a third virtual machine running on the second computing device, wherein the second virtual switch routes communication data received at the second computing device to the first virtual endpoint; and
   storing, by the first virtual switch and in virtual memory associated with the first virtual switch, an association between the destination address for the first virtual endpoint and the second virtual switch.

2. The first computing device of claim 1, the operations further comprising:
   receiving, at the first virtual switch and from a second virtual endpoint that is hosted on a fourth virtual machine running on the first computing device, communication data having a destination header populated with the destination address for the first virtual endpoint;
   identifying, in the virtual memory associated with the first virtual switch, the association between the destination address for the first virtual endpoint and the second virtual switch;
   determining, based at least in part on the association between the destination address for the first virtual endpoint and the second virtual switch, to forward the communication data to the second virtual switch; and
   sending the communication data from the first virtual switch to the second virtual switch.

3. The first computing device of claim 1, wherein the advertisement message is a first advertisement message, and the operations further comprising:
   receiving, by the first virtual switch, an indication that a fourth virtual machine executing on the first computing device is hosting a second virtual endpoint;
   determining, by the first virtual switch, a destination address for the second virtual endpoint hosted on the fourth virtual machine;
   storing, by the first virtual switch and in the virtual memory associated with the first virtual switch, an association between the destination address for the second virtual endpoint hosted on the fourth virtual machine and the first virtual switch;
   generating, by the first virtual switch, a second advertisement message including an indication of the destination address for the second virtual endpoint hosted on the fourth virtual machine; and causing, by the first virtual switch, the first computing device to send the second advertisement message to the second computing device, the first computing device and the second computing device being in a network.

4. The first computing device of claim 1, wherein the storing the association between the destination address for the first virtual endpoint and the second virtual switch comprises replacing a previous destination address for a second virtual endpoint that was hosted on the third virtual machine with the destination address.

5. The first computing device of claim 1, the operations further comprising:
identifying, by the first virtual switch and prior to storing the association between the destination address for the first virtual endpoint and the second virtual switch, an association between the destination address for the first virtual endpoint and the first virtual switch in the virtual memory associated with the first virtual switch; and
in response to the storing, removing the association between the destination address for the first virtual endpoint and the first virtual switch from the virtual memory associated with the first virtual switch.

6. The first computing device of claim 1, wherein destination address for the first virtual endpoint comprises at least one of an Internet Protocol (IP) address or a Media Access Control (MAC) address.

7. The first computing device of claim 1, wherein the advertisement message is encoded in a Type-Length-Value (TLV) format.

8. A method comprising:
executing, on a first computing device, a first virtual machine that is hosting a first virtual switch;
receiving, at the first computing device and from a second computing device executing a second virtual machine that is hosting a second virtual switch, an advertisement message including an indication of a destination address for a first virtual endpoint that is hosted on a third virtual machine running on the second computing device, wherein the second virtual switch routes communication data received at the second computing device to the first virtual endpoint; and
storing, in virtual memory associated with the first virtual switch, an association between the destination address for the first virtual endpoint and the second virtual switch.

9. The method of claim 8, further comprising:
receiving, at the first virtual switch and from a fourth virtual machine running on the first computing device, communication data having a destination header populated with the destination address for the first virtual endpoint;
identifying, in the virtual memory associated with the first virtual switch, the association between the destination address for the first virtual endpoint and the second virtual switch;
determining, based at least in part on the association between the destination address for the first virtual endpoint and the second virtual switch, to forward the communication data to the second virtual switch; and
sending the communication data from the first virtual switch to the second virtual switch.

10. The method of claim 8, wherein the advertisement message is a first advertisement message, and the method further comprising:

receiving, by the first virtual switch, an indication that a fourth virtual machine executing on the first computing device is hosting a second virtual endpoint;
determining, by the first virtual switch, a destination address for the second virtual endpoint hosted on the fourth virtual machine;
storing, by the first virtual switch and in the virtual memory associated with the first virtual switch, an association between the destination address for the second virtual endpoint hosted on the fourth virtual machine and the first virtual switch;
generating, by the first virtual switch, a second advertisement message including an indication of the destination address for the second virtual endpoint hosted on the fourth virtual machine; and
causing, by the first virtual switch, the first computing device to send the second advertisement message to the second computing device, the first computing device and the second computing device being in a network.

11. The method of claim 8, wherein the storing the association between the destination address for the first virtual endpoint and the second virtual switch comprises replacing a previous destination address for a second virtual endpoint that was hosted on the third virtual machine with the destination address.

12. The method of claim 8, further comprising:
identifying, by the first virtual switch and prior to storing the association between the destination address for the first virtual endpoint and the second virtual switch, an association between the destination address for the first virtual endpoint and the first virtual switch in the virtual memory associated with the first virtual switch; and
in response to the storing, removing the association between the destination address for the first virtual endpoint and the first virtual switch from the virtual memory associated with the first virtual switch.

13. The method of claim 8, wherein the destination address for the first virtual endpoint comprises at least one of an Internet Protocol (IP) address or a Media Access Control (MAC) address.

14. The method of claim 8, wherein the advertisement message is encoded in a Type-Length-Value (TLV) format.

15. A method comprising:
receiving, by a first virtual switch hosted on a first virtual machine executing on a first computing device, an indication that a second virtual machine executing on the first computing device is hosting a first virtual endpoint;
determining, by the first virtual switch, a destination address for the first virtual endpoint that is hosted on the second virtual machine;
storing, by the first virtual switch and in virtual memory associated with the first virtual switch, an association between the destination address for the first virtual endpoint and the first virtual switch;
generating, by the first virtual switch, an advertisement message including an indication of the destination address for the first virtual endpoint; and
causing, by the first virtual switch, the first computing device to send the advertisement message to a second computing device, the first computing device and second computing device being included in a network.

16. The method of claim 15, wherein the indication is received in response to at least one of the first virtual endpoint that is hosted on the second virtual machine executing for a first time on the first computing device or the first virtual endpoint that is hosted on the second virtual machine previously being hosted on a third virtual machine executing on a third computing device prior to migrating to the first computing device, the first computing device and the third computing device being included in a network.

17. The method of claim 15, further comprising:
receiving, by the first computing device and from the second computing device executing a third virtual machine that is executing a second virtual switch, communication data having a destination header populated with the destination address for the first virtual endpoint;
identifying, by the first virtual switch and in the virtual memory associated with the first virtual switch, the association between the destination address for the first virtual endpoint and the first virtual switch;
determining, by the first virtual switch, to forward the communication data to the first virtual endpoint, based at least in part on the association between the destination address for the first virtual endpoint and the first virtual switch; and
routing, by the first virtual switch, the communication data to the first virtual endpoint.

18. The method of claim 15, wherein the advertisement message is a first advertisement message, and the method further comprising:
receiving, by the first virtual switch and from the second computing device executing a third virtual machine that is hosting a second virtual switch, a second advertisement message including an indication of a destination address for a second virtual endpoint that is hosted on a fourth virtual machine running on the second computing device, wherein the second virtual switch routes communication data received at the second computing device to the second virtual endpoint; and
storing, by the first virtual switch and in the virtual memory associated with the first virtual switch, an association between the destination address for the second virtual endpoint and the second virtual switch.

19. The method of claim 18, further comprising:
receiving communication data having a destination header populated with the destination address for the second virtual endpoint;
identifying, by the first virtual switch and in the virtual memory associated with the first virtual switch, the association between the destination address for the second virtual endpoint and the second virtual switch;
determining, by the first virtual switch and based at least in part on the association between the destination address for the second virtual endpoint and the second virtual switch, to forward the communication data to the second virtual switch; and
causing, by the first virtual switch, the first computing device to send the communication data to the second computing device.

20. The method of claim 15, wherein the causing the first computing device to send the advertisement message comprises causing the first computing device to send the advertisement message to all additional computing devices included in the network.

* * * * *